United States Patent
Hotta et al.

(10) Patent No.: US 6,237,139 B1
(45) Date of Patent: May 22, 2001

(54) OBJECT-ORIENTED PROGRAMMING SUPPORT SYSTEM

(75) Inventors: Yuuji Hotta; Shigeki Suguta, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/046,557

(22) Filed: Mar. 24, 1998

(30) Foreign Application Priority Data

Sep. 3, 1997 (JP) .................................... 9-238571

(51) Int. Cl.$^7$ ....................................... G06F 9/45

(52) U.S. Cl. ..................... 717/4; 717/5; 717/8; 702/119

(58) Field of Search .................................. 395/704, 705, 395/708; 717/4, 5, 7, 8; 702/9, 119, 123; 703/23; 714/16

(56) References Cited

U.S. PATENT DOCUMENTS

| | | | | |
|---|---|---|---|---|
| 4,924,219 | * | 5/1990 | Sato ................................. | 340/825.49 |
| 5,428,792 | * | 6/1995 | Conner et al. ........................... | 717/8 |
| 5,450,586 | * | 9/1995 | Kuzara et al. ....................... | 395/704 |
| 5,493,680 | * | 2/1996 | Danforth ................................. | 717/2 |
| 5,560,009 | * | 9/1996 | Lenkov et al. ....................... | 395/704 |
| 5,590,330 | * | 12/1996 | Coskun et al. ........................... | 717/4 |
| 5,640,558 | * | 6/1997 | Li ........................................ | 707/101 |
| 5,699,271 | * | 12/1997 | Sagawa et al. ................. | 395/500.21 |
| 5,754,860 | * | 5/1998 | Mckeeman et al. ................. | 395/704 |
| 5,799,266 | * | 8/1998 | Hayes .................................... | 702/123 |

(List continued on next page.)

OTHER PUBLICATIONS

Dean et al, "Vortes: an optimizing compiler for object oriented languages", OOPSLA ACM pp. 83–100, 1996.*

Marques et al, "Extending the operating system to support an object orienetd environment", OOPSLA ACM pp. 113–122, Oct. 1989.*

Pope et al, "Object oriented approaches to the software life cycle using the smalltalk 80 system as a CASE toolkit", IEEE, pp. 13–20, Jul. 1987.*

Lin, "A system design methodology for software/hardware co development of telecommunication network applications", DAC ACM pp. 1–6, Jun. 1996.*

Tarr et al, "Pleiades: an objcet management system for software engineering environments", SIGSOFT ACM pp. 56–70, 1996.*

Schonberg et al, The GNAT project and GNU Ada 9x compiler, ACM pp. 48–57, Feb. 1994.*

Preston et al. "Object orienetd analysis transformations in Ada for real time systems with resources constraints", Washington Ada Symposium, ACM pp. 53–63, Mar. 1993.*

Ladkin et al. "Compile time analysis of communicating procesess", ICS ACM, pp. 248–259, Jun. 1992.*

Khwaja et al, "Syntax direcetd editing environments: issues and features", ACM SAC, pp. 230–237, Feb. 1993.*

*Primary Examiner*—Mark R. Powell
*Assistant Examiner*—Anil Khatri
(74) *Attorney, Agent, or Firm*—Staas & Halsey LLP

(57) ABSTRACT

A support system of object oriented programming includes a syntax analysis unit supplied with an object-oriented program and analyzing the same, a storage unit for storing convention information that describes a convention of the program, a collation unit for collating a result of analysis of the syntax analysis unit to the convention information held in the storage unit as to whether or not the result of analysis is in conformity with the convention, and a normalization unit for outputting a corrected program of the object-oriented program such that the corrected program is in conformity with the convention, when the result of analysis is in conflict with the convention.

77 Claims, 23 Drawing Sheets

U.S. PATENT DOCUMENTS

| | | | | |
|---|---|---|---|---|
| 5,864,700 | * | 1/1999 | Barton et al. | 395/705 |
| 5,864,862 | * | 1/1999 | Kriens et al. | 707/103 |
| 5,911,076 | * | 6/1999 | Acker et al. | 717/7 |
| 5,953,526 | * | 9/1999 | Day et al. | 717/11 |
| 6,002,874 | * | 12/1999 | Bahrs et al. | 717/5 |
| 6,093,215 | * | 7/2000 | Buxton et al. | 717/1 |
| 6,108,659 | * | 8/2000 | Vincent | 707/101 |
| 6,148,277 | * | 11/2000 | Asava et al. | 703/22 |
| 6,148,417 | * | 11/2000 | Da Silva | 714/25 |

* cited by examiner

FIG. 2A

INPUT PROGRAM

```
class A:public B,C {          int v;
  int mf(int);
  void mf(int,int);           int A:mf(int i) { int;a                         return;a

} ;                           } int f() {

A *a=(A* )malloc(sizeof(A) * max);
  return a;
}
```

FIG. 2B

ANALYSIS RESULT
GLOBAL INFO

| NAME | TYPE | DEF INFO |
|------|------|----------|
| A | CLASS | |
| f | FUNCTION | |
| B | CLASS | |
| C | CLASS | |
| v | VARIABLE | |

CLASS DEF INFO

| MEMBER DEF TABLE | |
|---|---|
| BASE CLASS LIST | |

FUNCTION LIST

| CALL TYPE | int f() |
|---|---|
| EQ INFO | |
| NEXT | |

BASE CLASS INFO

| ACCESS | public |
|---|---|
| CLASS | B |
| NEXT | |

| ACCESS | private |
|---|---|
| CLASS | C |
| NEXT | |

EQ INFO

| EQ | A* (A* )malloc(sizeof(A) * max) |
|---|---|
| NEXT | |

MEMBER DEF TABLE

| NAME | TYPE | DEF INFO |
|------|------|----------|
| mf | MEMBER FUNC | |
| a | DATA MEMBER | |

FUNC DEF LIST

| CALL TYPE | void mf(int) |
|---|---|
| RTN CODE | return a |
| RTN INFO | |
| NEXT | |

FUNC DEF LIST

| CALL TYPE | void mf(int, int) |
|---|---|
| RTN CODE | |
| RTN INFO | |
| NEXT | |

DATA DEF INFO

| TYPE | int |
|---|---|
| POINTER | false |

FIG. 3A

CONVENTION STRUCTURE

| CONVENTION INDEX | PROCESS |
|---|---|
| T1* v1=(T1* )malloc(sizeof(T1) * v2) | p35 |
| public T1 v1 | p34 |
| global T1 v1 | p33 |
|  |  |

FIG. 3B

NORMALIZATION

| PROCESS INDEX | PROCESS CONTENT (PSEUDO CODE) |
|---|---|
| p34 | SEARCH VARIABLE CORRESPONDING TO v1<br>SEARCH CLASS DEF FILE CORRESPONDING TO T1<br>ELIMINATE VARIABLE CORRESPONDING TO v1<br>FROM PUBLIC OF THE CLASS CORRESPONDING TO T1<br>ADD VARIABLE CORRESPONDING TO v1 TO private<br>OF THE CLASS CORRESPONDING TO T1 |
|  |  |

FIG. 3C

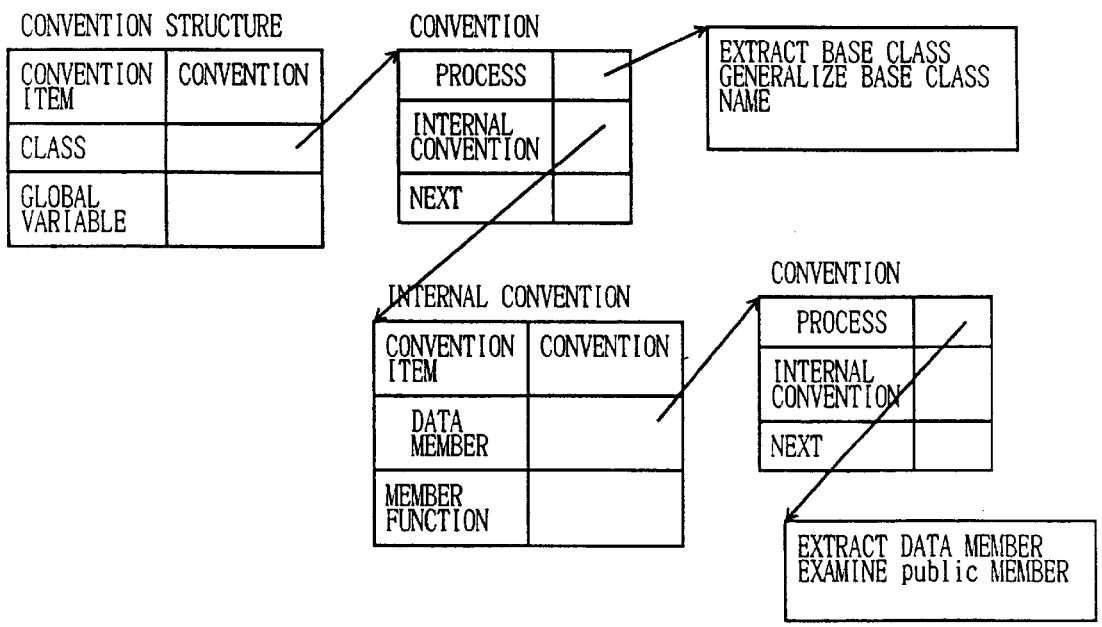

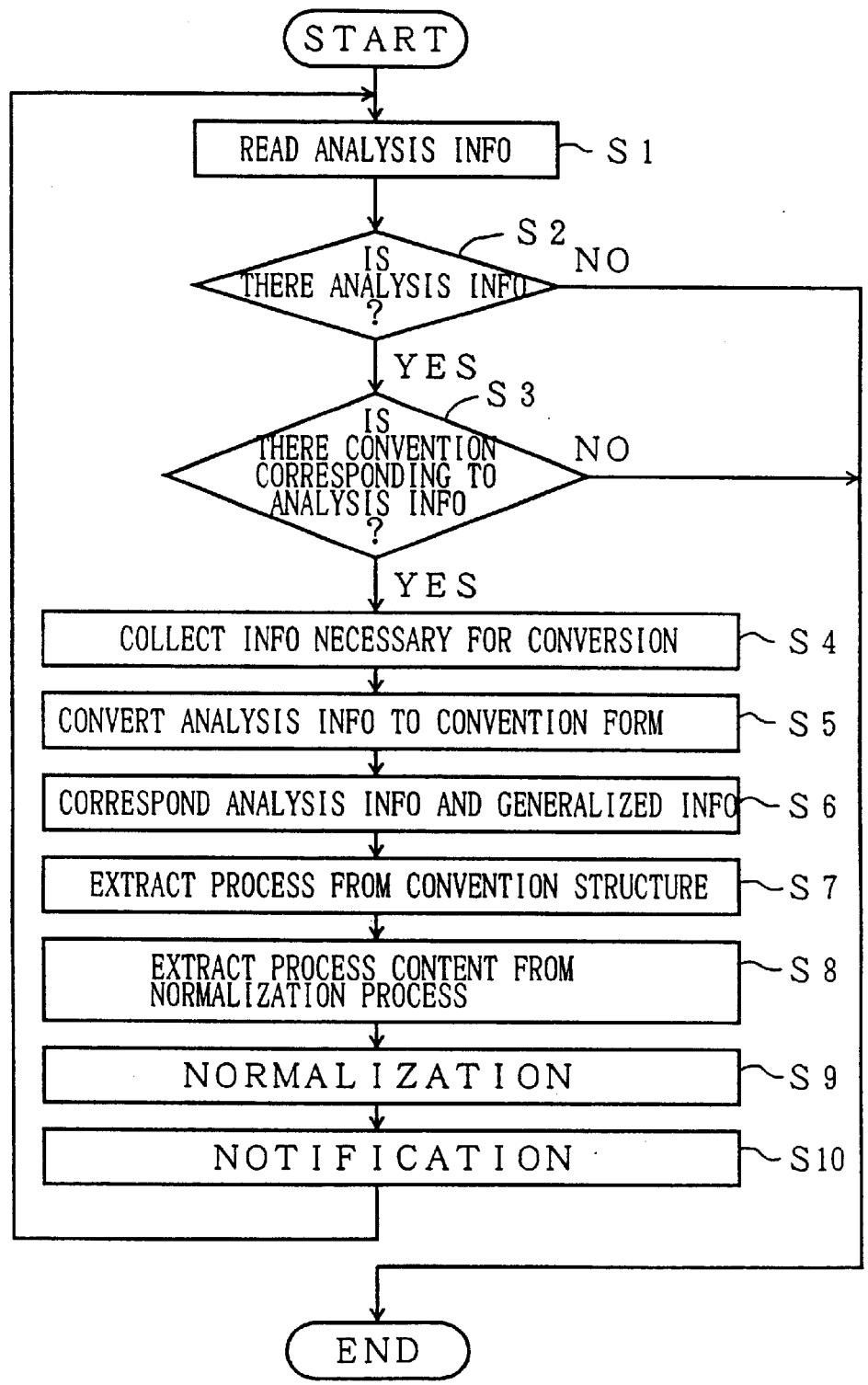

FIG. 5A
INPUT PROGRAM EXAMPLE

```
class Box {
public:
int f();
value_t x_value;
};
```

FIG. 5B
ANALYSIS RESULT

GLOBAL INFORMATION

| NAME | TYPE | DEF INFO |
|------|-------|----------|
| Box | CLASS | |
| f | FUNC | |
| | | |

CLASS DEF INFO

| MEMBER DEF INFO | |
|-----------------|--|
| BASE CLASS LIST | |

MEMBER DEF TABLE

| NAME | TYPE | DEF INFO |
|---------|-------------|----------|
| mf | MEMBER FUNC | |
| x_value | DATA MEMBER | |
| | | |

DATA DEF INFO

| TYPE | value_t |
|-----------|---------|
| ACCESS | public |
| STATIC | false |
| FILE NAME | Item.h |
| LINE NO | 32 |
| | |

FIG. 6A

ANALYSIS RESULT

GLOBAL INFO

| NAME | TYPE | DEF INFO |
|---|---|---|
| item_number | VARIABLE | |

VARIABLE DEF INFO

| TYPE | int |
|---|---|
| SCOPE | GLOBAL |

FIG. 6B

CONVENTION INFO

| CONVENTION ITEM | CONVENTION |
|---|---|
| GLOBAL VARIABLE | global T1 v1 |

FIG. 6C

CONVENTION STRUCTURE

| CONVENTION INDEX | PROC |
|---|---|
| global T1 v1 | p34 |

FIG. 6D

CONVENTION

| PROC p34 | |
|---|---|

PROC

| GATHER ALL GLOBAL VARIABLES |
|---|

FIG. 7A

ANALYSIS RESULT

GLOBAL INFO

| NAME | TYPE | DEF INFO |
|------|------|----------|
| A | FUNCTION | |

FUNCTION DEF INFO

| PROC | Box * b=(Box* )malloc(sizeof(Box) * max) |
|------|------------------------------------------|

FIG. 7B

CONVENTION INFO

| CONVENTION ITEM | CONVENTION |
|-----------------|------------|
| OBJECT ARRAY CREATE | T1* v1=(T1* )malloc(sizeof(T1)* v2) |

FIG. 7C

CONVENTION STRUCTURE

| CONVENTION INDEX | PROC |
|------------------|------|
| T1* v1=(T1* )malloc(sizeof(T1)* v2) | p35 |

FIG. 7D

CONNENTION

| PROC p35 |
|----------|

PROC

| CHANGE AREA RESERVATION FROM malloc TO new |
|--------------------------------------------|

FIG. 8A

ANALYSIS RESULT

GLOBAL INFO

| NAME | TYPE | DEF INFO |
|------|------|----------|
| A    | FUNC |          |

FUNCTION DEF INFO

| PROC | delete p |
|------|----------|

| PROC | X* p=new X[n] |
|------|---------------|

FIG. 8B

CONVENTION INFO

| CONVENTION ITEM | CONVENTION |
|-----------------|------------|
| OBJECT ARRAY DESTRUCT | delete v1 new T1[v2] |

FIG. 8C

CONVENTION STRUCTURE

| CONVENTION INDEX | PROC |
|------------------|------|
| delete v1 new T1[v2] | p36 |

FIG. 8D

CONVENTION

| PROC p36 | |
|----------|--|

PROC

| CHANGE delete TO delete[] |
|---------------------------|

FIG. 9A
ANALYSIS RESULT

GLOBAL INFO

| NAME | TYPE | DEF INFO |
|------|------|----------|
| A    | FUNC |          |

FUNCTION DEF INFO

| PROC | memset(p, 0, sizeof(T))     |
|------|-----------------------------|
| PROC | T* p= (T*)malloc(sizeof(T)) |

FIG. 9B
CONVENTION INFO

| CONVENTION ITEM   | CONVENTION                |
|-------------------|---------------------------|
| OBJECT INITIALIZE | memset(v1, v2, sizeof(T1))|

FIG. 9C
CONVENTION STRUCTURE

| CONVENTION INDEX            | PROC |
|-----------------------------|------|
| memset(v1, v2, sizeof(T1))  | p37  |

FIG. 9D

CONVENTION

| PROC p37 |

PROC

| INITIALIZE WITH memset() |

FIG. 10A

ANALYSIS RESULT

GLOBAL INFO

| NAME | TYPE | DEF INFO |
|------|------|----------|
| A | FUNC | |

FUNCTION DEF INFO

| PROC | memcpy(dst, src, sizeof(Box)) |
|------|-------------------------------|
| PROC | Box *src, *dst |

FIG. 10B

CONVENTION INFO

| CONVENTION ITEM | CONVENTION |
|-----------------|------------|
| OBJECT COPY | memcpy v1 v2 size T1 |

FIG. 10C

CONVENTION STRUCTURE

| CONVENTION INDEX | PROC |
|------------------|------|
| memcpy v1 v2 size T1 | p38 |

FIG. 10D

CONVENTION

| PROC p38 |
|----------|

PROC

| CHANGE COPY FROM memcpy() TO COPY CONSTRUCTOR |
|---|

FIG. 11A
ANALYSIS RESULT

GLOBAL INFO

| NAME | TYPE | DEF INFO |
|---|---|---|
| A | FUNC | |
| data | VARIABLE | |

FUNCTION DEF INFO

| PROC | func(data) |
|---|---|

VARIABLE DEF INFO

| TYPE | T |
|---|---|
| POINTER | false |

FIG. 11B
CONVENTION INFO

| CONVENTION ITEM | CONVENTION |
|---|---|
| CALL PARAMETER | Func Param T1 v1 |

FIG. 11C
CONVENTION STRUCTURE

| CONVENTION INDEX | PROC |
|---|---|
| Func Param T1 v1 | p39 |

FIG. 11D

CONVENTION

| PROC p39 |
|---|

PROC

| CHANGE FROM CALL-BY-VALE TO CALL-BY-REFERENCE |
|---|

FIG. 12A
ANALYSIS RESULT

GLOBAL INFO

| NAME | TYPE | DEF INFO |
|---|---|---|
| Box | CLASS | |

CLASS DEF INFO

| LOCAL INFO | |
|---|---|
| LOCAL INFO | |

| NAME | TYPE | DEF INFO |
|---|---|---|
| little_box | VARIABLE | |

VARIABLE DEF INFO

| ACCESS | public |
|---|---|

FIG. 12B
CONVENTION INFO

| CONVENTION ITEM | CONVENTION |
|---|---|
| MEMBER ACCESS | public T1 v1 |

FIG. 12C
CONVENTION STRUCTURE

| CONVENTION INDEX | PROC |
|---|---|
| public T1 v1 | p40 |

FIG. 12D

CONVENTION

| PROC p40 | |
|---|---|

PROC

| CHANGE public DATA MEMBER TO private |
|---|

FIG. 13A
ANALYSIS RESULT

GLOBAL INFO

| NAME | TYPE | DEF INFO |
|------|------|----------|
| Box | CLASS | |

CLASS DEF INFO

| LOCAL INFO | |
|------------|---|

LOCAL INFO

| NAME | TYPE | DEF INFO |
|------|------|----------|
| little_box | VARIABLE | |
| get_lbox | FUNCTION | |

VARIABLE DEF INFO

| POINTER | true |
|---------|------|

FUNCTION DEF INFO

| RETURN VALUE | little_box |
|--------------|------------|

FIG. 13B
CONVENTION INFO

| CONVENTION ITEM | CONVENTION |
|-----------------|------------|
| RETURN FROM MEMBER FUNCTION | class return member |

FIG. 13C
CONVENTION STRUCTURE

| CONVENTION INDEX | PROC |
|------------------|------|
| class return member | p41 |

FIG. 13D

| CONVENTION | |
|------------|---|
| PROC p41 | |

PROC

| CHANGE DATA MEMBER FUNCTION RETURNING POINTER SUCH THAT POINTER IS NOT RETURNED |
|---|

FIG. 14A

ANALYSIS RESULT

GLOBAL INFO

| NAME | TYPE | DEF INFO |
|---|---|---|
| T | CLASS | |

CLASS DEF INFO

| LOCAL INFO | |
|---|---|

LOCAL INFO

| NAME | TYPE | DEF INFO |
|---|---|---|
| height | VARIABLE | |
| sct_height | FUNCTION | |

FUNC DEF INFO

| EQ | height=d |
|---|---|

FIG. 14B

CONVENTION INFO

| CONVENTION ITEM | CONVENTION |
|---|---|
| SIMPLE DATA SET FUNC | class Initial Value v1=v2 |

FIG. 14C

CONVENTION STRUCTURE

| CONVENTION INDEX | PROC |
|---|---|
| class Initial Value v1=v2 | p42 |

FIG. 14D

CONVENTION

| PROC p42 | |
|---|---|

PROC

| INITIAL VALUE SETTING BY CONSTRUCTOR |
|---|

FIG. 15A
ANALYSIS RESULT

GLOBAL INFO

| NAME | TYPE | DEF INFO |
|---|---|---|
| T | CLASS | |

CLASS DEF INFO

| LOCAL INFO |  |
|---|---|

LOCAL INFO

| NAME | TYPE | DEF INFO |
|---|---|---|
| label | VARIABLE | |

VARIABLE DEF INFO

| POINTER | true |
|---|---|

FIG. 15B
CONVENTION INFO

| CONVENTION ITEM | CONVENTION |
|---|---|
| POINTER MEMBER | class Pointer Member T1* v1 |

FIG. 15C
CONVENTION STRUCTURE

| CONVENTION INDEX | PROC |
|---|---|
| class Pointer Member T1* v1 | p43 |

FIG. 15D

CONVENTION

| PROC p43 | |
|---|---|

PROC

DEFINE COPY CONSTRUCTOR TO CLASS INCLUDING A POINTER

FIG. 16A
ANALYSIS RESULT

GLOBAL INFO

| NAME | TYPE | DEF INFO |
|------|------|----------|
| T | CLASS | |

CLASS DEF INFO

| LOCAL INFO | |
|------------|--|

LOCAL INFO

| NAME | TYPE | DEF INFO |
|------|------|----------|
| label | VARIABLE | |

VARIABLE DEF INFO

| POINTER | true |
|---------|------|

FIG. 16B
CONVENTION INFO

| CONVENTION ITEM | CONVENTION |
|-----------------|------------|
| POINTER MEMBER | class Pointer Member T1* v1 |

FIG. 16C
CONVENTION STRUCTURE

| CONVENTION INDEX | PROC |
|------------------|------|
| class Pointer Member T1* v1 | p44 |

FIG. 16D

CONVENTION

| PROC p44 |
|----------|

PROC

| SET DESTRUCTOR TO CLASS INCLUDING A POINTER MEMBER |
|---|

FIG. 17A
ANALYSIS RESULT

GLOBAL INFO

| NAME | TYPE | DEF INFO |
|---|---|---|
| T | CLASS | |

CLASS DEF INFO

| LOCAL INFO | |
|---|---|

LOCAL INFO

| NAME | TYPE | DEF INFO |
|---|---|---|
| label | VARIABLE | |

VARIABLE DEF INFO

| POINTER | true |
|---|---|

FIG. 17B
CONVENTION INFO

| CONVENTION ITEM | CONVENTION |
|---|---|
| POINTER MEMBER | class Pointer Member T1* v1 |

FIG. 17C
CONVENTION STRUCTURE

| CONVENTION INDEX | PROC |
|---|---|
| class Pointer Member T1* v1 | p45 |

FIG. 17D

CONVENTION

| PROC p45 | |
|---|---|

PROC

| DEFINE ASSIGNMENT OPERATOR TO CLASS INCLUDING A POINTER MEMBER |
|---|

FIG. 18A

ANALYSIS RESULT

GLOBAL INFO

| NAME | TYPE | DEF INFO |
|------|------|----------|
| Box | CLASS | |

CLASS DEF INFO

| BASE CLASS LIST | |
|---|---|

BASE CLASS INFO

| ACCESS | private |
|--------|---------|
| CLASS | Shape |
| NEXT | |

FIG. 18B

CONVENTION INFO

| CONVENTION ITEM | CONVENTION |
|-----------------|------------|
| INHERITANCE METHOD | inherit T1 private T2 |

FIG. 18C

CONVENTION STRUCTURE

| CONVENTION INDEX | PROC |
|------------------|------|
| inherit T1 private T2 | p46 |

FIG. 18D

CONVENTION

| PROC p46 |
|----------|

PROC

| CHANGE private INHERITANCE TO public |
|---|

FIG. 19A
ANALYSIS RESULT

GLOBAL INFO

| NAME | TYPE | DEF INFO |
|------|-------|----------|
| T | CLASS | |
| U | CLASS | |

CLASS DEF INFO

| LOCAL INFO | |
|------------|--|

LOCAL INFO

| NAME | TYPE | DEF INFO |
|------|------|----------|
| get_data | FUNC | |

FUNC DEF INFO

| virtual | false |
|---------|-------|

FIG. 19B

CLASS DEF INFO

| BASE CLASS LIST | |
|-----------------|--|
| LOCAL INFO | |

BASE CLASS INFO

| CLASS | T |
|-------|---|
| NEXT | |

LOCAL INFO

| NAME | TYPE | DEF INFO |
|------|------|----------|
| get_data | FUNC | |

FUNC DEF INFO

| virtual | false |
|---------|-------|

FIG. 19C
CONVENTION INFO

| CONVENTION ITEM | CONVENTION |
|-----------------|------------|
| REDEFINE INHERITANCE FUNC | class virtual T1[] |

CONVENTION STRUCTURE

| CONVENTION INDEX | PROC |
|------------------|------|
| class virtual T1[] | p46 |

FIG. 19D

CONVENTION

| PROC p46 | |
|----------|--|

PROC

| RENAME NON-VIRTUAL FUNCTION IN INHERITED CLASS |
|------------------------------------------------|

FIG. 20A
ANALYSIS RESULT

GLOBAL INFO

| NAME | TYPE | DEF INFO |
|---|---|---|
| T | CLASS | |
| U | CLASS | |

CLASS DEF INFO

| DESTRUCTOR INFO | |
|---|---|
| CLASS DEF INFO | |
| BASE CLASS LIST | |

DESTRUCTOR INFO

| virtual | false |
|---|---|

BASE CLASS INFO

| CLASS | T |
|---|---|
| NEXT | |

FIG. 20B
CONVENTION INFO

| CONVENTION ITEM | CONVENTION |
|---|---|
| BASE CLASS DESTRUCOR | destructor-T1 base-T2 |

FIG. 20C
CONVENTION STRUCTURE

| CONVENTION INDEX | PROC |
|---|---|
| destructor-T1 base-T2 | p47 |

FIG. 20D
CONVENTION

| PROC p47 | |
|---|---|

PROC

| ⋯CHANGE DESTRUCTOR TO VIRTUAL |
|---|

FIG. 21A

ANALYSIS RESULT
GLOBAL INFO

| NAME | TYPE | DEF INFO |
|------|-------|----------|
| A | CLASS | |
| B | CLASS | |
| C | CLASS | |
| D | CLASS | |

CLASS DEF INFO

| BASE CLASS LIST | |
|---|---|

CLASS DEF INFO

| BASE CLASS LIST | |
|---|---|

CLASS DEF INFO

| BASE CLASS LIST | |
|---|---|

BASE CLASS INFO

| CLASS | A |
|---------|-------|
| virtual | false |

BASE CLASS INFO

| CLASS | A |
|---------|-------|
| virtual | false |

BASE CLASS INFO

| CLASS | B |
|-------|---|
| NEXT  |   |

| CLASS | C |
|-------|---|

FIG. 21B

CONVENTION INFO

| CONVENTION ITEM | CONVENTION |
|---|---|
| MULTIPLE INHERITANCE SAME BASE | T1 base T2 T3 base T4 |

FIG. 21C

CONVENTION STRUCTURE

| CONVENTION | PROC |
|---|---|
| T1 base T2 T3 base T4 | p48 |

FIG. 21D

CONVENTION

| PROC p48 | |
|---|---|

PROC

| DEFINE BASS CLASS INHERITANCE IN VIRTUAL BASE CLASS |
|---|

FIG. 22A

ANALYSIS RESULT

GLOBAL INFO

| NAME | TYPE | DEF INFO |
|------|-------|----------|
| A | CLASS | |
| B | CLASS | |
| C | CLASS | |

CLASS DEF INFO

| BASE CLASS LIST | |
|---|---|

BASE CLASS INFO

| CLASS | B |
|-------|---|
| ACCESS | public |
| NEXT | |

| CLASS | C |
|-------|---|
| ACCESS | none |

FIG. 22B

CONVENTION INFO

| CONVENTION ITEM | CONVENTION |
|-----------------|------------|
| BASE CLASS ACCESS | T1 base T2 |

FIG. 22C

CONVENTION STRUCTURE

| CONVENTION INDEX | PROC |
|------------------|------|
| T1 base T2 | p49 |

FIG. 22D

| CONVENTION | |
|------------|---|
| PROC p49 | |

PROC

| PROVIDE ACCESS LEVEL TO BASE CLASS |
|---|

OBJECT-ORIENTED PROGRAMMING SUPPORT SYSTEM

BACKGROUND OF THE INVENTION

The present invention generally relates to the art of object-oriented programming and more particularly to an object-oriented programming support system for improving productivity of object-oriented programming and program development.

Program languages are used in computers for formulating a processing to be carried out by the computer. Among others, C and C++ languages are used extensively these days, wherein the C++ language is particularly useful for describing an object-oriented program.

When developing a program, a newly created program is subjected to a compiling process for converting the program to a form ready for execution by a computer, wherein an error message is issued when there is an error in the compiled program. An error message generally includes information such as the location of the error in the program and a brief explanation on the grammar that caused the error. Thus, the programmer has to verify the program based on the error message for necessary correction.

However, such conventional error messages have been insufficient as a guidance of error correction for programmers, and the error correction has remained a tedious procedure for a programmer. In object-oriented programs, in particular, there can be a case in which the program includes no grammatical error in spite of the fact that the program contains inadequate description. In such a case, no error message is issued at all. Thus, the inadequate part remains in the program as a bug until it is noticed by an unexpected behavior of the computer system.

SUMMARY OF THE INVENTION

Accordingly, it is a general object of the present invention to provide a support system of object-oriented programming wherein the foregoing problems are eliminated.

Another object of the present invention is to provide a support system of object-oriented programming wherein the support system analyzes an object-oriented program and checks for the result of the analysis by using convention information that describes the convention of the object-oriented program. The support system thereby points out the part of the program where the convention is violated as an error and proposes an example program in which the error is corrected.

Another object of the present invention is to provide a support system of object oriented programming, comprising:
  a syntax analysis unit supplied with an object-oriented program and analyzing said object-oriented program;
  a storage unit for storing convention information that describes a convention of said program;
  a collation unit for collating a result of analysis of said syntax analysis unit to said convention information held in said storage unit; and
  a normalization unit for outputting a corrected program of said object-oriented program based on a result of a collation in said collation unit.

Another object of the present invention is to provide a computer specially configured by executing program code stored on a computer-usable media for supporting object oriented programming, said program code comprising:
  computer-readable syntax analysis means supplied with an object-oriented program code for analyzing said object-oriented program code;
  computer-readable collation means for collating a result of analysis of said syntax analysis means to a convention information held in a storage unit as to whether or not said result of analysis is in conformity with said convention; and
  computer-readable normalization means for outputting a corrected program of said object-oriented program such that said corrected program is in conformity with said convention, when said result of analysis is in conflict with said convention.

Another object of the present invention is to provide a processor-readable medium storing program code for supporting object oriented programming, said program code comprising:
  computer-readable syntax analysis means supplied with an object-oriented program code for analyzing said object-oriented program code;
  computer-readable collation means for collating a result of analysis of said syntax analysis means to a convention information held in a storage unit as to whether or not said result of analysis is in conformity with said convention; and
  computer-readable normalization means for outputting a corrected program of said object-oriented program such that said corrected program is in conformity with said convention, when said result of analysis is in conflict with said convention.

Another object of the present invention is to provide a computer-readable storage medium storing a process for supporting object oriented programming, said process comprises the steps of:
  analyzing an object-oriented program code;
  collating a result of the analyzing step to a convention information held in a storage unit as to whether or not said result of the analyzing step is in conformity with said convention; and
  outputting a corrected program of said object-oriented program such that said corrected program is in conformity with said convention, when said result of the analyzing step is in conflict with said convention.

Another object of the present invention is to provide a computer-implemented method of supporting object oriented programming, said method comprising the steps of:
  analyzing an object-oriented program code;
  collating a result of said analyzing step to a convention information held in a storage unit as to whether or not said result of the analyzing step is in conformity with said convention; and
  outputting a corrected program of said object-oriented program such that said corrected program is in conformity with said convention, when said result of the analyzing step is in conflict with said convention.

According to the present invention, a created object-oriented program is checked for the conventions by using the convention information held in the storage unit for any violation of the conventions. When there is a violation of the convention, the support system of the present invention proposes a corrected program.

Other objects and further features of the present invention will become apparent from the following detailed description when read in conjunction with the attache drawings.

BRIEF DESCRIPTION OF THE DRAWINGS

FIGS. 2A and 2B are diagrams explaining a syntax analysis used in the present invention;

FIGS. 3A–3C are diagrams explaining convention information used in the present invention;

FIG. 4 is a flowchart showing the process conducted by the system of FIG. 1 according to a first embodiment of the present invention;

FIGS. 5A and 5B are diagrams explaining the process of FIG. 4;

FIGS. 6A–6D are diagrams explaining a process according to a second embodiment of the present invention;

FIGS. 7A–7D are diagrams explaining a process according to a third embodiment of the present invention;

FIGS. 8A–8D are diagrams explaining a process according to a fourth embodiment of the present invention;

FIGS. 9A–9D are diagrams explaining a process according to a fifth embodiment of the present invention;

FIGS. 10A–10D are diagrams explaining a process according to a sixth embodiment of the present invention;

FIGS. 11A–11D are diagrams explaining a process according to a seventh embodiment of the present invention;

FIGS. 12A–12D are diagrams explaining a process according to an eighth embodiment of the present invention;

FIGS. 13A–13D are diagrams explaining a process according to a ninth embodiment of the present invention;

FIGS. 14A–14D are diagrams explaining a process according to a tenth embodiment of the present invention;

FIGS. 15A–15D are diagrams explaining a process according to an eleventh embodiment of the present invention;

FIGS. 16A–16D are diagrams explaining a process according to a twelfth embodiment of the present invention;

FIGS. 17A–17D are diagrams explaining a process according to a thirteenth embodiment of the present invention;

FIGS. 18A–18D are diagrams explaining a process according to a fourteenth embodiment of the present invention;

FIGS. 19A–19D are diagrams explaining a process according to a fifteenth embodiment of the present invention;

FIGS. 20A–20D are diagrams explaining a process according to a sixteenth embodiment of the present invention;

FIGS. 21A–21D are diagrams explaining a process according to a seventeenth embodiment of the present invention;

FIGS. 22A–22D are diagrams explaining a process according to an eighteenth embodiment of the present invention.

DETAILED DESCRIPTION OF THE PREFERRED EMBODIMENTS

[First Embodiment]

Figure 1:
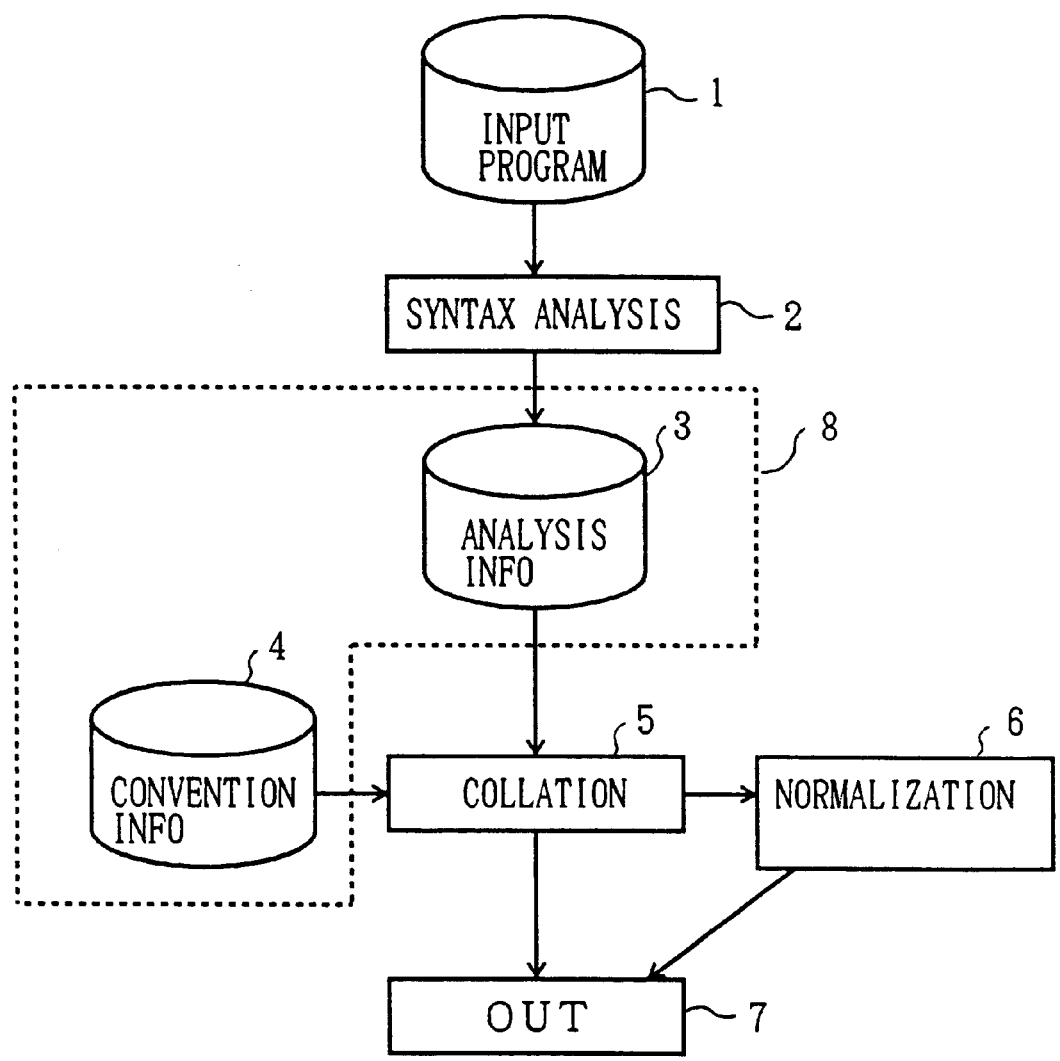
FIG. 1 is a block diagram explaining a general constitution of a programming support system of the present invention.

FIG. 1 shows the overall construction of an object-oriented programming support system according to a first embodiment of the present invention.

Referring to FIG. 1, the support system includes a syntax analysis unit 2 supplied with an object-oriented program 1 for analyzing a syntax thereof. Further, the support system includes a storage unit 8 holding therein syntax analysis information 3 created by the syntax analysis unit 2 as a result of the syntax analysis of the object-oriented program 1 and also convention information 4, and a collation unit 5 compares the syntax analysis information 3 held in the storage unit 8 with the convention information 4. Further, a normalization unit 6 normalizes the result of comparison obtained by the collation unit 5 and creates a proposed program in which any conflict to the convention information 4 is resolved. Further, the support system includes an output unit 7 for outputting the proposed program.

More in detail, the syntax analysis unit 2 detects, when the program 1 is given, various information such as the name or type of the classes or data members of the classes included in the program 1 and further the information such as parameter type or return information for each of the member functions. Further, the syntax analysis unit 2 detects the information such as operators in the class, equations for conducting a memory operation of objects, inheritance between the classes, and further the information of global variables, wherein the information thus detected are assembled to form the syntax analysis information 3.

Based on the syntax analysis information 3 thus formed, the collation unit 5 compares the part of the program 1 in which a code convention is described with the convention information 4, and the collation unit 5 transfers the part in which the convention is violated to the output unit 7. Further, the normalization unit 6 is used to normalize or modify the program information included in the syntax information 3 in compliance with the convention information 4, to create a proposed program. The proposed program is forwarded to the output unit 7.

Hereinafter, the syntax analysis information 3 produced by the syntax analysis unit 2 will be explained with reference to FIG. 2B showing the result of the syntax analysis for an example program of FIG. 2A which is described by the C++ language.

Referring to FIG. 2B, the syntax analysis information 3 indicative of the result of the syntax analysis of the unit 2 includes various information such as global information (GLOBAL INFO), class definition information (CLASS DEF INFO), function definition list (FUNC DEF INFO), equation information (EQ INFO), member definition table (MEMBER DEF TABLE), definition function list (DEF FUNC LIST), data definition information (DATA DEF INFO), and the like.

The global information includes the designation of classes, functions, variables, and the like, and further the definition information of these. In the case of a class, for example, a member definition table and a base class list are included as the class definition information. The member definition table, on the other hand, includes definition information for each of the member types, wherein the member types may includes a member function (corresponds to a procedure) and a data member (corresponds to a data structure), wherein the member function and the data member form a struct. It should be noted that the definition information of the member function may include a function definition list, while a function definition list may include call type information, return code return-back information, and the like. Further, the data member includes a type or pointer as the data definition information.

The base class list includes, on the other hand, the access type or access class as the base class information. For example, the access type "private" indicates that the access to the class is possible only from the objects of the same class, while the access type "public" indicates that the access from the objects of other classes is also possible. Further, the function definition list includes the information of call type and equation, wherein the equation information includes the information of actual equations.

FIG. 3A shows the structure of the convention information 4.

Referring to FIG. 3A, the convention information is stored in the storage unit 8 as a convention structure that defines a convention index and a corresponding process. For example, it can be seen that a process index of the process "p34" is defined in correspondence to a convention index "public T1 V1" in the example of FIG. 3A.

Thus, the normalization unit 6 carries out the normalization processing by describing the content of the processing corresponding to the foregoing process index as indicated in FIG. 3B and executing the described processing when the processing index is given.

The collation unit 5, on the other hand, extracts the necessary information from the syntax analysis information 3 and converts the same into a convention form as indicated in FIG. 3C.

Referring to FIG. 3C showing an example of the convention information, the convention information includes global or top level information such as class information or global variable information. These are called convention items, wherein each of the convention items includes one or more conventions. In the case of a class, there is a convention generally applicable to classes. The convention includes an internal convention for the data members, member functions, and the like. It should be noted that the convention describes the processing for normalizing the analysis information.

FIG. 4 shows the operation of the collation unit 5 corresponding to FIG. 5 showing an example of the input program and the result of the syntax analysis of the input program.

Referring FIG. 4, the process of the collation unit 5 starts with a step S1 by reading the analysis information and proceeds further to the next step S2 in which a discrimination is made whether or not there exists the analysis information. In the illustrated example of FIG. 5, the process is thus started for a class "Box" based on the global information.

Next, in the step S3, a discrimination is made whether or not there is a convention corresponding to the analysis information. Generally, a class or a function has a corresponding conversion processing that converts the analysis information to a convention form. In the case of the analysis information for the class "Box" of FIG. 5, a discrimination is made as to whether or not there exists a processing corresponding to the class in the step S3, and if the result is YES, the corresponding processing is stored in a memory.

Next, the collation unit 5 collects necessary information for conversion in the step S4. In the example of FIG. 5, the conversion to the convention form is conducted by collecting the information necessary for the conversion of the analysis information to the convention form (convention index), starting from the class definition information for the class "Box." The collation unit 5 then converts the analysis information to the corresponding convention form in the next step S5, wherein the convention index information is created in the step S5.

Further, in the step S6, the collation unit 5 converts the analysis information pertinent to the class such as "value_t" or "value_x" to more general representation form such as "T1" or "v1," wherein the generic representation form thus obtained is saved in the step S6. Next, in the step S7, the convention collation unit 5 collates the information in the convention structure with the convention index and extracts the corresponding normalization process. Further, the convention collation unit 5 extracts the content of the process in the step S8 by collating with the extracted process index. Further, the analysis information normalization unit 6 is activated in the step S9 in which a normalized program (corrected program example) is created by executing the content of the processing. Finally, the normalized program is outputted from the output unit 7 in the step S10.

Hereinafter, various other features of the present invention will be described.

[Second Embodiment]

According to a second embodiment of the present invention, a conversion of analysis information to a corresponding convention form is conducted and the convention information for the global variables is extracted as a result of the collation to the convention. As there is a convention that global variables should be gathered to form a single struct, a correction program is prepared if it is necessary. The following is an example of the processing of the second embodiment.

[Input Example]

The following is an example of the input.

int item_number=100;
int proc( )
{
    int num=item_number;
    . . .
}

[Analysis Information]

The following information is extracted from the analysis information. See FIG. 6A.

| variable name | type | global | ... |
|---|---|---|---|
| item_number | int | true | |

[Convention Form of Analysis Information]

The result of the analysis is converted to the following convention form. See FIG. 6B.

| convention index | variable correspondence |
|---|---|
| global T1 v1 | T1:int v1:item_number |

[Convention Structure]

A search is made on the convention and the following convention structure is extracted. See FIG. 6C.

| convention index | processing |
|---|---|
| global T1 v1 | p . . |

[Normalization Processing]

The processing is extracted and executed. See FIG. 6D.

| process index | content |
|---|---|
| p . . . | gather global variables to form a single struct |

[Output Example]

The following is an example of the output.
```
struct Global {
    static int item_number;
};
int Global::item_number=100;
int proc( )
{
    int index=Global::item_number;
    . . .
}
```

The above processing is summarized as follows.

The convention "global T1 v1" is acquired from the convention structure, and the variable information "item_number" is acquired from the global information. As the variable definition information indicates that this is a global variable, the foregoing convention of the global variable is applied to the variable by conducting the normalization process of FIG. 6D. Thereby all the global variables are gathered to form a struct.

[Third Embodiment]

According to a third embodiment of the present invention, a conversion of analysis information to a corresponding convention form is conducted and the convention information for creating an object array is extracted as a result of the collation to the convention. As there is a convention that an object array should be created according to the process "new," a correction program is prepared if it is necessary. The following is an example of the processing of the third embodiment.

[Input Example]

The following is an example of the input.
Box*b=(Box*)malloc(sizeof(Box)*max);

[Analysis Information]

The following information is extracted from the analysis information. See FIG. 7A.
Equation . . .
Box*b=(Box*)malloc(sizeof(Box)*max) . . .

[Convention Form of Analysis Information]

The result of the analysis is converted to the following convention form. See FIG. 7B.

| convention index | variable correspondence |
|---|---|
| T1*v1 = (T1*)malloc(sizeof(T1)*v2) | T1:Box v1:b v2:max |

[Convention Structure]

A search is made on the convention and the following convention structure is extracted. See FIG. 7C.

| convention index | processing |
|---|---|
| T1*v1 = (T1*)malloc(sizeof(T1)*v2) | p . . |

[Normalization Processing]

The processing is extracted and executed. See FIG. 7D.

| process index | content of processing |
|---|---|
| p . . | change the area reservation from "malloc" to "new" |

[Output Example]

The following is an output example.
Box*b=new Box[max];

Summarizing above, the convention "T1*v1=(T1*)malloc(sizeof(T1)*v2)" is acquired from the convention structure and the function name A is acquired from the global information. From the function definition information, it is known that there exists an equation Box*b=(Box*)malloc(sizeof(Box)*max). Thus, the foregoing convention for the object array creation is applied to the equation, by conducting the normalization process of FIG. 7D.

[Fourth Embodiment]

According to a fourth embodiment of the present invention, a conversion of analysis information to the corresponding convention form is conducted and the convention information for destruction of object array is extracted as a result of the collation to the convention. As there is a convention that the destruction of an object array should be achieved by using "delete [ ]," a correction program is prepared if it is necessary. The following is an example of the processing of the fourth embodiment.

[Input Example]

The following is an example of the input.
X*p=new X[n]
delete p;

[Analysis Information]

The following information in the analysis information is used. See FIG. 8A.

| equation | creation |
|---|---|
| delete p | new X[n] |

[Convention Form of Analysis Information]

The result of the analysis is converted to the following convention form. See FIG. 8B.

| process index | content |
|---|---|
| p . . | replace destruction by "delete" with "delete [ ]" |

[Convention Structure]

A search is made on the convention and the following convention structure is extracted. See FIG. 8C.

| convention index | variable correspondence |
|---|---|
| delete v1 new T1[v2] | T1:X v1:p v2:n |

[Normalization Processing]

The processing is extracted and executed. See FIG. 8D.

| convention index | processing |
|---|---|
| delete v1 new T1[v2] | p . . |

[Output Example]

The following is an example of the output.
X*p=new X[n];
delete [ ]p;

Summarizing above, the convention "delete v1 new T1[v2]" is acquired from the convention structure and the function name A is acquired from the global information. From the function definition information, it is known that there exist equations "delete p" and "X*p=new X[n]". Thus, the foregoing equations are used for the convention for the destruction of the object array, by conducting the normalization process of FIG. 8D.

[Fifth Embodiment]

According to a fifth embodiment of the present invention, a conversion of analysis information to a convention form is conducted and the convention information for initializing an object is extracted as a result of the collation to the convention. As there is a convention that the initialization of an object should be achieved by using a constructor, a correction program is prepared if it is necessary. The following is an example of the processing of the fifth embodiment.

[Input Example]

The following is an example of the input.
T*p;
p=(T*)malloc(sizeof(T));
memset(p,0,sizeof(T));

[Analysis Information]

The following information in the analysis information is used. See FIG. 9A.
equation . . .
memset(b, 0, sizeof(Box)) . . .

[Convention Form of Analysis Information]

The result of the analysis is converted to the following convention form. See FIG. 9B.

| convention index | variable correspondence |
|---|---|
| memset(v1, v2, sizeof(T1)) | T1:Box v1:p v2:0 |

[Convention Structure]

A search is made on the convention and the following convention structure is extracted. See FIG. 9C.

| convention index | processing |
|---|---|
| memset(v1, v2, sizeof(T1)) | p . . |

[Normalization Processing]

The processing is extracted and executed. See FIG. 9D.

| process index | content |
|---|---|
| p . . | replace initialization by memset() with a constructor |

[Output Example]

The following is an example of the output.
class T {
public:
    T( ){ . . }
};
. .
T*p;
p=new T( );
. .

Summarizing above, the convention "memset(v1, v2, sizeof(T1))" is acquired from the convention structure and the function name A is acquired from the global information. From the function definition information, it is known that there exist equations "memset(p, 0, sizeof(T)) and T*p=(T*)malloc(sizeof(T)). Thus, the foregoing equations are used for the initialization of the object, by conducting the process of FIG. 9D.

[Sixth Embodiment]

According to a sixth embodiment of the present invention, a conversion of analysis information to a convention form is conducted and the convention information for copying an object is extracted as a result of the collation to the convention. As there is a convention in the copying of objects that the copying of an object should be conducted by using a copy constructor, a correction program is prepared if it is necessary. The following is an example of the processing of the sixth embodiment.

[Input Example]

The following is an example of the input.
class Box {
public;
. .
};
. .
Box*src, *dst;
src=new Box( );
dst=new Box( );
. .
memcpy(dst, src, sizeof(Box));

[Analysis Information]

The following information in the analysis information is used. See FIG. 10A.
equation . . .
memcpy(dst, src, sizeof(Box)); . . .

[Convention Form of Analysis Information]

The result of the analysis is converted to the following convention form. See FIG. 10B.

| convention index | variable correspondence |
|---|---|
| memcpy v1, v2, size T1 | T1:Box v1:dst v2:src |

[Convention Structure]

A search is made on the convention and the following convention structure is extracted. See FIG. 10C.

| convention index | processing |
|---|---|
| memcpy v1, v2, sizeT1 | p . . |

[Normalization Processing]

The processing is extracted and executed. See FIG. 10D.

| process index | content |
|---|---|
| p . . | replace copy by memcpy with the copy constructor |

[Output Example]

The following is an example of the output.
class Box {
public:
  Box(const Box &b) { . . }
. .
};
. .
Box *src, *dst;
src=new Box( );
. .
dst =new Box(*src);
Summarizing above, the convention "memcpy v1 v2 size T1" is acquired from the convention structure and the function name A is acquired from the global information. From the function definition information, it is known that there exist equations "memcpy(dst, src, sizeof(Box)), Box *src, and *dst. Thus, the foregoing convention of copying the object is applied to the equations, by conducting the process of FIG. 10D.

[Seventh Embodiment]

According to a seventh embodiment of the present invention, a conversion of analysis information to the convention form is conducted and the convention information for calling a parameter is extracted as a result of the collation to the convention. As there is a convention in the process of calling a parameter that the calling should be conducted by reference (call by reference), a correction program is prepared if it is necessary. The following is an example of the processing of the seventh embodiment.

[Input Example]

The following is an example of the input.
T data;
func(data);
void func(T d)
{;

[Analysis Information]

The following information in the analysis information is used. See FIG. 11A.

| member function name | parameter | . . . |
|---|---|---|
| foo_proc | Box b | . . . |

[Convention Form of Analysis Information]

The result of the analysis is converted to the following convention form. See FIG. 11B.

| convention index | variable correspondence |
|---|---|
| Func Param T1 v1 | T1:Box v1:b |

[Convention Structure]

A search is made on the convention and the following convention structure is extracted. See FIG. 11C.

| convention index | processing |
|---|---|
| Func Param T1 v1 | p . . |

[Normalization Processing]

The processing is extracted and executed. See FIG. 11D.

| process index | content |
|---|---|
| p . . | change call-by-value to call-by-reference |

[Output Example]

The following is an example of the output.
T data func(data);
void func(T &d)
{

Summarizing above, the convention "Func Param T1 v1" is acquired from the convention structure and the function name A is acquired from the global information. From the function definition information, it is known that there exists an equation "func(data)," indicating that a call is made by using the variable "data." Thus, the variable name information of "data" is obtained from the global information, and it is confirmed from the variable definition information that "data" is not a pointer. Thereby, the foregoing convention is applied to the process of calling a parameter, by conducting the normalization process of FIG. 11D.

[Eighth Embodiment]

According to an eighth embodiment of the present invention, a conversion of analysis information to the convention form is conducted and the convention information for access control is extracted as a result of the collation to the convention. As there is a convention in the access control that the data members accessing an object have to be "private," a correction program is prepared if it is necessary. The following is an example of the processing of the eighth embodiment.

[Input Example]

The following is an example of the input.
class T {
public:
   C*get_data( ) {return data;}
private:
   C*data;
};
   T*t=new T( );
   C*d;
   d=t.get_data( );

[Analysis Information]

The following information in the analysis information is used. See FIG. 13A.

| equation | type . . |
|---|---|
| return little_box | Box . . . |

[Convention Form of Analysis Information]

The result of the analysis is converted to the following convention form. See FIG. 13B.

| convention index | variable correspondence |
|---|---|
| class return member v1 | v1:little_box |

[Convention Structure]

A search is made on the convention and the following convention structure is extracted. See FIG. 13C.

| convention index | processing |
|---|---|
| class return member | p . . |

[Normalization Processing]

The processing is extracted and executed. See FIG. 13D.

| process index | content |
|---|---|
| p . . | set "const" to data member that returns a pointer |

[Output Example]

The following is an example of the output.
class T {
public:
   const C*get_data( ) (return data;}
private:
   C*data;
};
   T*t=new T( );
   const C*d;
   d=t.get_data( );

Summarizing above, the convention "class return member" is acquired from the convention structure and the class name information of the class "Box" is acquired from the global information. Thereby, local information is extracted from the corresponding class definition information and the data member "little box" is extracted from the corresponding local information, wherein the variable definition information indicates that the "public" accessing is made to the data member "little_box." Thus, the access control is changed to from "public" to "private" as explained above by conducting the normalization process of FIG. 12D.

[Ninth Embodiment]

According to a ninth embodiment of the present invention, a conversion of analysis information to the convention form is conducted and the convention information for return control from a member function is extracted as a result of the collation to the convention. As there is a convention in the return control that the member functions should not return the pointer of the member functions, a correction program is prepared if it is necessary. The following is an example of the processing of the ninth embodiment.

[Input Example]

The following is an example of the input.
class T {
public:
   C*get_data( ) {return data;}
private:
   C*data;
};
   T*t=new T( );
   C*d;
   d=t.get_data( );
   . .

[Analysis Information]

The following information in the analysis information is used. See FIG. 13A.

| equation | type | |
|---|---|---|
| return little_box | Box | ... |

[Convention Form of Analysis Information]

The result of the analysis is converted to the following convention form. See FIG. 13B.

| convention index | variable correspondence |
|---|---|
| class return member v1 | v1:little_box |

[Convention Structure]

A search is made on the convention and the following convention structure is extracted. See FIG. 13C.

| convention index | processing |
|---|---|
| class return member | p .. |

[Normalization Processing]

The processing is extracted and executed. See FIG. 13D.

| process index | content |
|---|---|
| p .. | set const to the data member that returns the data member pointer |

[Output Example]

The following is an example of the output.
```
class T {
public:
    const C*get_data( ) {return data;}
private:
    C*data;
};
T*t=new T( );
const C*d;
d=t.get_data( );
```

Summarizing above, the convention "class return member" is acquired from the convention structure and the class name information of the class "Box" is acquired from the global information. Thereby, local information is extracted from the corresponding class definition information and the data member "little_box" is extracted from the corresponding local information, wherein the variable definition information indicates that the data member "little_box" is a pointer type. Further, a member function "get_1box" is extracted from the local information, wherein it is known from the function definition information that the member function "get_1box" returns the data member "little_box" as the return value. Thus, this statement of the data member function is modified in conformity with the convention for returning from the member function by conducting the normalization process of FIG. 13D.

[Tenth Embodiment]

According to a tenth embodiment of the present invention, a conversion of analysis information to the convention form is conducted and the convention information for a simpler data setting function is extracted as a result of the collation to the convention. As there is a convention in the data setting that, whenever it is possible, the data should be set by using a contractor, a correction program is prepared if it is necessary. The following is an example of the processing of the tenth embodiment.

[Input Example]

The following is an example of the input.
```
class T {
public:
    void set_high(double d) {height=d:}
private:
    double height;
};
```

[Analysis Information]

The following information in the analysis information is used. See FIG. 14A.

| member definition function | type | |
|---|---|---|
| little_width = w | int | ... |

[Convention Form of Analysis Information]

The result of the analysis is converted to the following convention form. See FIG. 14B.

| convention index | variable correspondence |
|---|---|
| class InitialValue v1 = v2 | v1:little_width v2:w |

[Convention Structure]

A search is made on the convention and the following convention structure is extracted. See FIG. 14C.

| convention index | processing |
|---|---|
| class InitialValue v1 = v2 | p .. |

[Normalization Processing]

The processing is extracted and executed. See FIG. 14D.

| process index | content |
|---|---|
| p .. | conduct initial value setting by using a constructor |

[Output Example]

The following is an example of the output.
```
class T {
``` public:
   T(double _height) {height=_height;}
   void set_height(double d){height=d;}
private:
   double height;
};

Summarizing above, the convention "class InitialValue v1=v2" is acquired from the convention structure and the class name information of the class "T" is acquired from the global information. Thereby, local information is extracted from the corresponding class definition information and the local information indicates that there is a data member "set_height." Thus, the member function "set_height" is extracted from the local information, wherein it is known that from the function definition information that the member function "set_height" is a simple value-setting function that sets a value to the variable "height." Thus, the forgoing convention of simple data setting function is applied to the class under consideration by conducting the normalization process of FIG. 14D.

[Eleventh Embodiment]

According to an eleventh embodiment of the present invention, a conversion of analysis information to the convention form is conducted and the convention information for a pointer member is extracted as a result of the collation to the convention. As there is a convention that a copy constructor has to be defined properly when there is a class including a pointer-type data member. Thus, a correction program is prepared if it is necessary and an example of proper definition of the copy constructor is notified to the programmer. The following is an example of the processing of the eleventh embodiment.

[Input Example]

The following is an example of the input.
class T {
private;
   char *label;
};

[Analysis Information]

The following information in the analysis information is used. See FIG. 15A.

| member definition function | type ... |
|---|---|
| label | char*... |

[Convention Form of Analysis Information]

The result of the analysis is converted to the following convention form. See FIG. 15B.

| convention index | variable correspondence |
|---|---|
| class PointerMember T1*v1 | T1:char * v1 :label |

[Convention Structure]

A search is made on the convention and the following convention structure is extracted. See FIG. 15C.

| convention index | processing |
|---|---|
| class PointerMember T1*v1 | p1 |

[Normalization Processing]

The processing is extracted and executed. See FIG. 15D.

| process index | content |
|---|---|
| p.. | define a copy constructor to a class including the pointer-type member |

[Output Example]

The following is an example of the output.
class T {
public:
   T(const T&t) fdata=strdup(t.get_label( ))}
   char *get_label( ){return label;}
private:
   char label;
};

Summarizing above, the convention "class PointerMember T1*v1" is acquired from the convention structure and the class name information of the class "T" is acquired from the global information. Thereby, local information is extracted from the corresponding class definition information and the local information indicates that there is a data member "label." Further, it is known from the variable definition information that "label" is a pointer. Thus, the foregoing convention is applied to the class under consideration by conducting the normalization process of FIG. 15D.

[Twelfth Embodiment]

According to a twelfth embodiment of the present invention, a conversion of analysis information to the convention form is conducted and the convention information for a pointer member is extracted as a result of the collation to the convention. As there is a convention that a destructor has to be defined properly when there is a class including a pointer-type data member. Thus, a correction program is prepared if it is necessary and an example of proper definition of the destructor is notified to the programmer. The following is an example of the processing of the twelfth embodiment.

[Input Example]

The following is an example of the input.
class T {
private;
   char *label;
};

[Analysis Information]

The following information in the analysis information is used. See FIG. 16A.

| member definition function | type ... |
|---|---|
| label | char*... |

[Convention Form of Analysis Information]

The result of the analysis is converted to the following convention form. See FIG. 16B.

| convention index | variable correspondence |
|---|---|
| class PointerMember T1*v1 | T1:char * v1 :label |

[Convention Structure]

A search is made on the convention and the following convention structure is extracted. See FIG. 16C.

| convention index | processing |
|---|---|
| class PointerMember T1*v1 | p1 |

[Normalization Processing]

The processing is extracted and executed. See FIG. 16D.

| process index | content |
|---|---|
| p.. | define a destructor to a class including the pointer-type member |

[Output Example]

The following is an example of the output.
class T {
public:
−T( ) {delete [ ]label;}
private:
    char *label;
};

Summarizing above, the convention "class PointerMember T1*v1" is acquired from the convention structure and the class name information of the class "T" is acquired from the global information. Thereby, local information is extracted from the corresponding class definition information and the local information indicates that there is a data member "label." Further, it is known from the variable definition information that "label" is a pointer. Thus, the foregoing convention is applied to the class under consideration by conducting the normalization process of FIG. 16D.

[Thirteenth Embodiment]

According to a thirteenth embodiment of the present invention, a conversion of analysis information to the convention form is conducted and the convention information for a pointer member is extracted as a result of the collation to the convention. As there is a convention that an assignment operator has to be defined properly when there is a class including a pointer-type data member. Thus, a correction program is prepared if it is necessary and an example of proper definition of the assignment operator is notified to the programmer. The following is an example of the processing of the thirteenth embodiment.

[Input Example]

The following is an example of the input.
class T {
private;
    char *label;
};

[Analysis Information]

The following information in the analysis information is used. See FIG. 17A.

| member definition function | type ... |
|---|---|
| label | char*... |

[Convention Form of Analysis Information]

The result of the analysis is converted to the following convention form. See FIG. 17B.

| convention index | variable correspondence |
|---|---|
| class PointerMember T1*v1 | T1:char * v1 :label |

[Convention Structure]

A search is made on the convention and the following convention structure is extracted. See FIG. 17C.

| convention index | processing |
|---|---|
| class PointerMember T1*v1 | p1 |

[Normalization Processing]

The processing is extracted and executed. See FIG. 17D.

| process index | content |
|---|---|
| p.. | define an assignment operator to a class including the pointer-type member |

[Output Example]

The following is an example of the output.
class T {
public:
    const T &operator=(const Box &src) {
        if(&src !=this) {
            delete [ ] label;
            label=new char[strlen(src. label)+1];
            strcpy(label,src.label);
        }
        return *this;
    } private:
   char *label;
};

Summarizing above, the convention "class PointerMember T1*v1" is acquired from the convention structure and the class name information of the class "T" is acquired from the global information. Thereby, local information is extracted from the corresponding class definition information and the local information indicates that there is a data member "label." Further, it is known from the variable definition information that "label" is a pointer. Thus, the foregoing convention is applied to the class under consideration by conducting the normalization process of FIG. 17D.

[Fourteenth Embodiment]

According to a fourteenth embodiment of the present invention, a conversion of analysis information to the convention form is conducted and the convention information for an inheritance method is extracted as a result of the collation to the convention. As there is a convention that the inheritance has to be made public, a correction program is prepared if it is necessary, and an example of proper inheritance is notified to the programmer. The following is an example of the processing of the fourteenth embodiment.

[Input Example]

The following is an example of the input.
class T :private U {
  ..
};

[Analysis Information]

The following information in the analysis information is used. See FIG. 18A.

| class name | base class | ... |
|---|---|---|
| Box | private Shape | ... |

[Convention Form Of Analysis Information]

The result of the analysis is converted to the following convention form. See FIG. 18B.

| convention index | variable correspondence |
|---|---|
| inherit T1 private T2 | T1:Box T2:Shape |

[Convention Structure]

A search is made on the convention and the following convention structure is extracted. See FIG. 18C.

| convention index | processing |
|---|---|
| inherit T1 private | p .. |

[Normalization Processing]

The processing is extracted and executed. See FIG. 18D.

| process index | content |
|---|---|
| p .. | rewrite private inheritance to public inheritance |

[Output Example]

The following is an example of the output.
class T :public U {
  ..

Summarizing above, the convention "inherit T1 private T2" is acquired from the convention structure and the class name information of the class "Box" is acquired from the global information. Thereby, local information is extracted from the corresponding class definition information and the local information indicates that the accessing to the base class is "private." Thus, the "private" inheritance is rewritten to a "public" inheritance and the foregoing convention is applied to the class under consideration by conducting the normalization process of FIG. 18D.

[Fifteenth Embodiment]

According to a fifteenth embodiment of the present invention, a conversion of analysis information to the convention form is conducted and the convention information for a redefinition of inheritance function is extracted as a result of the collation to the convention. As there is a convention that a function defined in the base class as a non-virtual function should not be redefined in a derived class, a correction program is prepared if it is necessary, and a corrected example in which the inherited non-virtual function is not defined in the derived class is notified to the programmer. The following is an example of the processing of the fifteenth embodiment.

[Input Example]

The following is an example of the input.
class T {
public:
  int get __data( );
};
class U : public T{
public:
  int get __data( );

[Analysis Information]

The following information in the analysis information is used. See FIG. 19A.

| member function name | type | virtual | ... |
|---|---|---|---|
| get_info | int | true | ... |

[Convention Form Of Analysis Information]

The result of the analysis is converted to the following convention form. See FIG. 19B.

| convention index | variable correspondence |
|---|---|
| class virtual T1 f1 | T1: int fi: get _info |

[Convention Structure]

A search is made on the convention and the following convention structure is extracted. See FIG. 19C.

| convention index | processing |
|---|---|
| inherit T1 f1 | p .. |

[Normalization Processing]

The processing is extracted and executed. See FIG. 19D.

| process index | content |
|---|---|
| p .. | change name of the non-virtual function redefined in the inherited class |

[Output]

The following is an example of the output.
class T {
public:
  int get _data( );
};
class U :public T {
public:
  int Uget _data( );//change name
};

Summarizing above, the convention "class virtual T1 f1" is acquired from the convention structure and the class name information "U" is acquired from the global information. Further, the base class information is extracted from the class definition information and it is known that there is a base class "T." Further, the function information "get _data" is extracted from the local information, and it is known from the local information that the function "get _data" is not a virtual function. Based upon this, the convention of the inheritance method is applied to the class by conducting the normalization process of FIG. 19D.

[Sixteenth Embodiment]

According to a sixteenth embodiment of the present invention, a conversion of analysis information to the convention form is conducted and the convention information for a destructor of base class is extracted as a result of the collation to the convention. As there is a convention that the destructor of a base class should be defined as a virtual function, a correction program is prepared if it is necessary, and an example of correction in which the base class destructor is defined as a virtual function is notified to the programmer. The following is an example of the processing of the sixteenth embodiment.

[Input Example]

The following is an example of the input.
class T {
public:
  ~T( )
};
class U : public T {
public:
  ~U( );
}

[Analysis Information]

The following information in the analysis information is used. See FIG. 20A.

| destructor | virtual | class | base class | ... |
|---|---|---|---|---|
| ~Box | false | Box | Shape | ... |

[Convention Form Of Analysis Information]

The result of the analysis is converted to the following convention form. See FIG. 20B.

| convention index | variable correspondence |
|---|---|
| destructor | ~T1 base ~T2 ~T1:~Box ~T2:~Shape |

[Convention Structure]

A search is made on the convention and the following convention structure is extracted. See FIG. 20C.

| convention index | processing |
|---|---|
| destructor ~T1 base ~T2 | p .. |

[Normalization Processing]

The processing is extracted and executed. See FIG. 20D.

| process index | content |
|---|---|
| p .. | change the destructor of the base class to a virtual function |

[Output]

The following is an example of the output.
class T {
public:
  virtual ~T( );
};
class U :public T {
public:
  virtual ~U( );
};

Summarizing above, the convention information "destructor ~T1 base ~T2" is acquired from the convention structure and the class name information "U" is acquired from the global information. Further, the base class information is extracted from the class definition information and it is known that there is a base class "T." Further, the class information is extracted from the local information, and it is known from the destructor information of the class definition information that the destructor is not a virtual function. Based upon this, the convention of the base class destructor is applied to the class by conducting the normalization process of FIG. 20D.

[Seventeenth Embodiment]

According to a seventeenth embodiment of the present invention, a conversion of analysis information to the convention form is conducted and the convention information for a multiple inheritance is extracted as a result of the collation to the convention. It should be noted that there is a convention that, when a multiple inheritance of classes having the same base class is to be defined. Thus, a virtual base class should be defined for the base class and a correction program is prepared if necessary. Further, an example of correction, in which inheritance of the classes having the same base class is defined for the virtual base class, is notified to the programmer. The following is an example of the processing of the seventeenth embodiment.

[Input Example]

The following is an example of the input.
class A {

..
};
class B: public A {

..
};
class C: public A {

..
};
class D; public B, public C {

..
};

[Analysis Information]

The following information in the analysis information is used. See FIG. 21A.

| class name | base class    ... |
|------------|-------------------|
| Rectangle  | Box window ...    |

[Convention Form Of Analysis Information]

The result of the analysis is converted to the following convention form. See FIG. 21B.

| convention index       | variable correspondence       |
|------------------------|-------------------------------|
| T1 base T2 T3 base T4  | T1: Rectangle   T2: Box       |
|                        | T3: Window      T4: Shape     |

[Convention Structure]

A search is made on the convention and the following convention structure is extracted. See FIG. 21C.

| convention index       | processing |
|------------------------|------------|
| T1 base T2  T3 base T4 | p ..       |

[Normalization Processing]

The processing is extracted and executed. See FIG. 21D.

| process index | content                                                        |
|---------------|----------------------------------------------------------------|
| p ..          | change the inheritance of the base class to a virtual class    |

[Output]

The following is an example of the output.
class A {

..
};
class B: public virtual A {

..
};
class C: public virtual A {

..
};
class D: public B, public C {

..
};

Summarizing above, the convention information "T1 base T2 T3 base T4" is acquired from the convention structure and the class name information "D" is acquired from the global information. Further, the base class information is extracted from the class definition information and it is known that there is a multiple inheritance of the classes B and C. Further, the class information for the class B is extracted from the global information and it is known, from the base class information, that there is an inheritance from a non-virtual class A. Further, the class information of the class C is acquired from the global information and it is known from the base class information that there is an inheritance from the non-virtual class A. Based upon the same, the foregoing convention of the multiple inheritance of the classes having the same base class is applied to the classes B and C by conducting the process of FIG. 21D.

[Eighteenth Embodiment]

According to an eighteenth embodiment of the present invention, a conversion of analysis information to the convention form is conducted and the convention information for a multiple inheritance is extracted as a result of the collation to the convention. As there is a convention in the multiple inheritance that the access level of the base class should be specified for all the base classes, a correction program is prepared if necessary and an example of correction, in which the access level is specified for the base class, is notified to the programmer.

[Input Example]

The following is an example of the input.
class A: public B, C {

..
);

[Analysis Information]

The following information in the analysis information is used. See FIG. 22A.

| class name | base class . . . |
|---|---|
| Rectangle | Box Box, Window . . . |

[Convention Form of Analysis Information]

The result of the analysis is converted to the following convention form. See FIG. 22B.

| convention index | variable correspondence |
|---|---|
| T1 base T2 | T1: Rectangle T2: Window |

[Convention Structure]

A search is made on the convention and the following convention structure is extracted. See FIG. 22C.

| convention index | processing |
|---|---|
| T1 base T2 | p . . |

[Normalization Processing]

The processing is extracted and executed. See FIG. 22D.

| process index | content |
|---|---|
| p . . | provide access level to all the base classes |

[Output]

The following is an example of the output.
class A: public B, public C {
. .
};

Summarizing above, the convention information "T1 base T2" is acquired from the convention structure and the class name information "A" is acquired from the global information. Further, the base class information is extracted from the class definition information and it is known that the class C lacks the access level. Thus, the foregoing convention is applied to the class A by conducting the normalization process of FIG. 22D.

Figure 23:
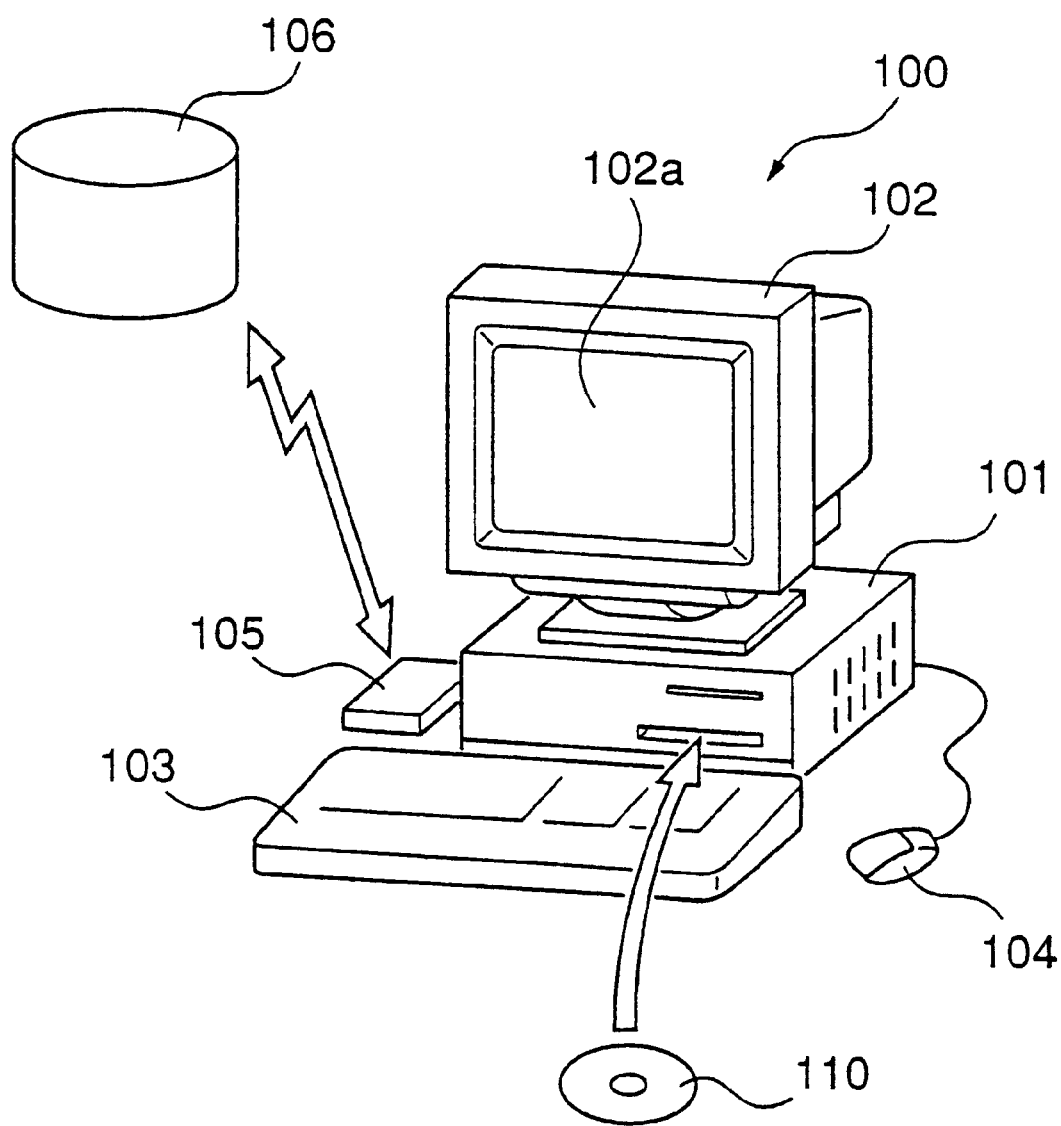
FIG. 23 is a diagram showing the hardware construction of the system of FIG. 1.

FIG. 23 shows the hardware construction of an object-oriented programming support system 100 according to the present invention, wherein the object-oriented programming support system 100 may conduct any of the foregoing preceding embodiments.

Referring to FIG. 23, the programming support system 100 is formed by a computer system and includes a main body 101 in which a CPU and one or more disk drives are provided, a display 102 that displays images or data on a screen 102a thereof in response to the instruction from the main body 101, a keyboard 103 for inputting various information to the computer system 100, a mouse 104 for pointing an arbitrary position on the screen 102a, and a modem 105 for accessing an external database 106.

In the computer system 100 of FIG. 23, it should be noted that a removable storage medium 110 such as an optical disk or flexible disk storing therein the process of the steps S1–S10 of FIG. 4 in the form of program is mounted on a corresponding slot of the disk drive of the main body 101. Alternatively, the foregoing program may be downloaded from the external database 106 via the modem 104. Thereby, the CPU in the main body 101 executes the program.

Further, the present invention is not limited to the embodiments described heretofore, but various variations and modifications may be made without departing from the scope of the invention.

What is claimed is:

1. A support system of object oriented programming, comprising:
    a syntax analysis unit supplied with an object-oriented program and analyzing said object-oriented program;
    a storage unit storing convention information that describes a convention of said program;
    a collation unit collating a result of analysis of said syntax analysis unit to said convention information held in said storage unit as to whether or not said result of analysis is in conformity with said convention; and
    a normalization unit outputting a corrected program of said object-oriented program such that said corrected program is in conformity with said convention, when said result of analysis is in conflict with said convention.

2. A support system as claimed in claim 1, wherein said collation unit checks said result of analysis for existence of a global variable, and wherein said normalization unit creates a modified program, when a global variable is detected, such that said modified program does not includes said global variable.

3. A support system as claimed in claim 1, wherein said collation unit checks said result of analysis as to whether or not a creation of an object in said object-oriented program occurs in conformity with said convention, and wherein said normalization unit creates said modified program, when said result of analysis is no, such that said object is created in conformity with said convention.

4. A support system as claimed in claim 1, wherein said collation unit checks said result of analysis as to whether or not a destruction of an object in said object-oriented program occurs in conformity with said convention, and wherein said normalization unit creates said modified program, when said result of analysis is no, such that said object is destroyed in conformity with said convention.

5. A support system as claimed in claim 1, wherein said collation unit checks said result of analysis as to whether or not initialization of an object in said object-oriented program occurs in conformity with said convention by using information on memory management included in said result of analysis, and wherein said normalization unit creates said modified program, when said result of analysis is no, such that said object is initialized in conformity with said convention.

6. A support system as claimed in claim 1, wherein said collation unit checks said result of analysis as to whether or not copying of an object in said object-oriented program occurs in conformity with said convention by using information on memory management included in said result of analysis, and wherein said normalization unit creates said modified program, when said result of analysis is no, such that said object is copied in conformity with said convention.

7. A support system as claimed in claim 1, wherein said collation unit checks said result of analysis as to whether or not there is a call-by-value parameter for said object, and wherein said normalization unit creates said modified program, when said result of analysis is no, such that there is no call-by-value parameter for said object.

8. A support system as claimed in claim 1, wherein said collation unit checks said result of analysis as to whether or not there is a public data member opened to outside a class, and wherein said normalization unit creates said modified program, when said result is no, such that said data member is private.

9. A support system as claimed in claim 1, wherein said collation unit checks said result of analysis as to whether or not a member function returns a pointer of a data member, and wherein said normalization unit creates said modified program, when said result is no, such that said member function does not return said pointer of said data member.

10. A support system as claimed in claim 1, wherein said collation unit checks said result of analysis as to whether or not a member function is a simple data access function, and wherein said normalization unit creates said modified program, when said result is no, such that said member function is not said simple data access function.

11. A support system as claimed in claim 1, wherein said collation unit checks said result of analysis as to whether or not a copy constructor is defined properly when there is a class including a pointer-type data member, and wherein said normalization unit creates, upon confirmation of intent of a user of said support system, said modified program, when said result is no, such that said copy constructor is defined properly.

12. A support system as claimed in claim 1, wherein said collation unit checks said result of analysis as to whether or not a destructor is defined properly when there is a class including a pointer-type data member, and wherein said normalization unit creates, upon confirmation of intent of a user of said support system, said modified program, when said result is no, such that said destructor is defined properly.

13. A support system as claimed in claim 1, wherein said collation unit checks said result of analysis as to whether or not an assignment operator is defined properly when there is a class including a pointer-type data member, and wherein said normalization unit creates, upon confirmation of intent of a user of said support system, said modified program, when said result is no, such that said assignment operator is defined properly.

14. A support system as claimed in claim 1, wherein said collation unit checks said result of analysis as to whether or not there is an inheritance about specific accessing, and wherein said normalization unit creates said modified program, when said result is yes, such that said inheritance is proper.

15. A support system as claimed in claim 1, wherein said collation unit checks said result of analysis as to whether or not there is a redefinition of an inherited non-virtual function, and wherein said normalization unit creates said modified program, when said result is yes, such that said inherited non-virtual function is not redefined.

16. A support system as claimed in claim 1, wherein said collation unit checks said result of analysis as to whether or not a destruction of object is functioning properly in an inherited class, and wherein said normalization unit creates said modified program, when said result is no, such that said destruction of object occurs properly.

17. A support system as claimed in claim 1, wherein said collation unit checks said result of analysis, when there is a multiple inheritance of classes from a common base class, as to whether or not said base class is inherited as a virtual base class, and wherein said normalization unit creates said modified program, when said result is no, such that said base class is inherited as a virtual base class.

18. A support system as claimed in claim 1, wherein said collation unit checks said result of analysis, when there are multiple base classes in a definition of inheritance, as to whether or not all of said base classes are provided with an access level specifier, and wherein said normalization unit creates, upon confirmation of intent of a user of said support system, said modified program, when said result is no, such that all of said base classes are provided with an access level specifier.

19. A computer specially configured by executing program code stored on a computer-usable media for supporting object oriented programming, said program code comprising:

computer-readable syntax analysis means supplied with an object-oriented program code for analyzing said object-oriented program code;

computer-readable collation means for collating a result of analysis of said syntax analysis means to a convention information held in a storage unit as to whether or not said result of analysis is in conformity with said convention; and computer-readable normalization means for outputting a corrected program of said object-oriented program such that said corrected program is in conformity with said convention, when said result of analysis is in conflict with said convention.

20. A computer as claimed in claim 19, wherein said collation means checks said result of analysis for existence of a global variable, and wherein said normalization means creates a modified program code, when a global variable is detected, such that said modified program code does not includes said global variable.

21. A computer as claimed in claim 19, wherein said collation means checks said result of analysis as to whether or not a creation of an object in said object-oriented program code occurs in conformity with said convention, and wherein said normalization means creates said modified program code, when said result of analysis is no, such that said object is created in conformity with said convention.

22. A computer as claimed in claim 19, wherein said collation means checks said result of analysis as to whether or not a destruction of an object in said object-oriented program code occurs in conformity with said convention, and wherein said normalization means creates said modified program code, when said result of analysis is no, such that said object is destroyed in conformity with said convention.

23. A computer as claimed in claim 19, wherein said collation means checks said result of analysis as to whether or not initialization of an object in said object-oriented program code occurs in conformity with said convention by using information on memory management included in said result of analysis, and wherein said normalization means creates said modified program code, when said result of analysis is no, such that said object is initialized in conformity with said convention.

24. A computer as claimed in claim 19, wherein said collation means checks said result of analysis as to whether or not copying of an object in said object-oriented program code occurs in conformity with said convention by using information on memory management included in said result of analysis, and wherein said normalization means creates said modified program code, when said result of analysis is no, such that said object is copied in conformity with said convention.

25. A computer as claimed in claim 19, wherein said collation means checks said result of analysis as to whether or not there is a call-by-value parameter for said object, and wherein said normalization means creates said modified program code, when said result of analysis is no, such that there is no call-by-value parameter for said object.

26. A computer as claimed in claim 19, wherein said collation means checks said result of analysis as to whether or not there is a public data member opened to outside a class, and wherein said normalization means creates said modified program code, when said result is no, such that said data member is private.

27. A computer as claimed in claim 19, wherein said collation means checks said result of analysis as to whether or not a member function returns a pointer of a data member, and wherein said normalization means creates said modified program code, when said result is no, such that said member function does not return said pointer of said data member.

28. A computer as claimed in claim 19, wherein said collation means checks said result of analysis as to whether or not a member function is a simple data access function, and wherein said normalization means creates said modified program code, when said result is no, such that said member function is not said simple data access function.

29. A computer as claimed in claim 19, wherein said collation means checks said result of 25 analysis as to whether or not a copy constructor is defined properly when there is a class including a pointer-type data member, and wherein said normalization means creates, upon confirmation of intent of a user of said computer, said modified program code, when said result is no, such that said copy constructor is defined properly.

30. A computer as claimed in claim 19, wherein said collation unit checks said result of analysis as to whether or not a destructor is defined properly when there is a class including a pointer-type data member, and wherein said normalization unit creates, upon confirmation of intent of a user of said computer, said modified program, when said result is no, such that said destructor is defined properly.

31. A computer as claimed in claim 19, wherein said collation means checks said result of analysis as to whether or not an assignment operator is defined properly when there is a class including a pointer-type data member, and wherein said normalization means creates, upon confirmation of intent of a user of said computer, said modified program code, when said result is no, such that said assignment operator is defined properly.

32. A computer as claimed in claim 19, wherein said collation means checks said result of analysis as to whether or not there is an inheritance about specific accessing, and wherein said normalization means creates said modified program, when said result is yes, such that said inheritance is proper.

33. A computer as claimed in claim 19, wherein said collation means checks said result of analysis as to whether or not there is a redefinition of an inherited non-virtual function, and wherein said normalization means creates said modified program code, when said result is yes, such that said inherited non-virtual function is not redefined.

34. A computer as claimed in claim 19, wherein said collation means checks said result of analysis as to whether or not a destruction of object is functioning properly in an inherited class, and wherein said normalization means creates said modified program code, when said result is no, such that said destruction of object occurs properly.

35. A computer as claimed in claim 19, wherein said collation means checks said result of analysis, when there is a multiple inheritance of classes from a common base class, as to whether or not said base class is inherited as a virtual base class, and wherein said normalization means creates said modified program code, when said result is no, such that said base class is inherited as a virtual base class.

36. A computer as claimed in claim 19, wherein said collation means checks said result of analysis, when there are multiple base classes in a definition of inheritance, as to whether or not all of said base classes are provided with an access level specifier, and wherein said normalization means creates said modified program code, when said result is no, such that all of said base classes are provided with an access level specifier.

37. A processor-readable medium storing program code for supporting object oriented programming, said program code comprising:

computer-readable syntax analysis means supplied with an object-oriented program code for analyzing said object-oriented program code;

computer-readable collation means for collating a result of analysis of said syntax analysis means to a convention information held in a storage unit as to whether or not said result of analysis is in conformity with said convention; and computer-readable normalization means for outputting a corrected program of said object-oriented program such that said corrected program is in conformity with said convention, when said result of analysis is in conflict with said convention.

38. A processor-readable medium as claimed in claim 37, wherein said collation means checks said result of analysis for existence of a global variable, and wherein said normalization means creates a modified program code, when a global variable is detected, such that said modified program code does not includes said global variable.

39. A processor-readable medium as claimed in claim 37, wherein said collation means checks said result of analysis as to whether or not a creation of an object in said object-oriented program code occurs in conformity with said convention, and wherein said normalization means creates said modified program code, when said result of analysis is no, such that said object is created in conformity with said convention.

40. A processor-readable medium as claimed in claim 37, wherein said collation means checks said result of analysis as to whether or not a destruction of an object in said object-oriented program code occurs in conformity with said convention, and wherein said normalization means creates said modified program code, when said result of analysis is no, such that said object is destroyed in conformity with said convention.

41. A processor-readable medium as claimed in claim 37, wherein said collation means checks said result of analysis as to whether or not initialization of an object in said object-oriented program code occurs in conformity with said convention by using information on memory management included in said result of analysis, and wherein said normalization means creates said modified program code, when said result of analysis is no, such that said object is initialized in conformity with said convention.

42. A processor-readable medium as claimed in claim 37, wherein said collation means checks said result of analysis as to whether or not copying of an object in said object-oriented program code occurs in conformity with said convention by using information on memory management included in said result of analysis, and wherein said normalization means creates said modified program code, when said result of analysis is no, such that said object is copied in conformity with said convention.

43. A processor-readable medium as claimed in claim 37, wherein said collation means checks said result of analysis as to whether or not there is a call-by-value parameter for said object, and wherein said normalization means creates said modified program code, when said result of analysis is no, such that there is no call-by-value parameter for said object.

44. A processor-readable medium as claimed in claim 37, wherein said collation means checks said result of analysis as to whether or not there is a public data member opened to outside a class, and wherein said normalization means creates said modified program code, when said result is no, such that said data member is private.

45. A processor-readable medium as claimed in claim 37, wherein said collation means checks said result of analysis as to whether or not a member function returns a pointer of a data member, and wherein said normalization means creates said modified program code, when said result is no, such that said member function does not return said pointer of said data member.

46. A processor-readable medium as claimed in claim 37, wherein said collation means checks said result of analysis as to whether or not a member function is a simple data access function, and wherein said normalization means creates said modified program code, when said result is no, such that said member function is not said simple data access function.

47. A processor-readable medium as claimed in claim 37, wherein said collation means checks said result of analysis as to whether or not a copy constructor is defined properly when there is a class including a pointer-type data member, and wherein said normalization means creates, upon confirmation of intent of a user of said processor, said modified program code, when said result is no, such that said copy constructor is defined properly.

48. A processor-readable medium as claimed in claim 37, wherein said collation unit checks said result of analysis as to whether or not a destructor is defined properly when there is a class including a pointer-type data member, and wherein said normalization unit creates, upon confirmation of intent of a user of said processor, said modified program, when said result is no, such that said destructor is defined properly.

49. A processor-readable medium as claimed in claim 37, wherein said collation means checks said result of analysis as to whether or not an assignment operator is defined properly when there is a class including a pointer-type data member, and wherein said normalization means creates, upon confirmation of intent of a user of said processor, said modified program code, when said result is no, such that said assignment operator is defined properly.

50. A processor-readable medium as claimed in claim 37, wherein said collation means checks said result of analysis as to whether or not there is an inheritance about specific accessing, and wherein said normalization means creates said modified program, when said result is yes, such that said inheritance is proper.

51. A processor-readable medium as claimed in claim 37, wherein said collation means checks said result of analysis as to whether or not there is a redefinition of an inherited non-virtual function, and wherein said normalization means creates said modified program code, when said result is yes, such that said inherited non-virtual function is not redefined.

52. A processor-readable medium as claimed in claim 37, wherein said collation means checks said result of analysis as to whether or not a destruction of object is functioning properly in an inherited class, and wherein said normalization means creates said modified program code, when said result is no, such that said destruction of object occurs properly.

53. A processor-readable medium as claimed in claim 37, wherein said collation means checks said result of analysis, when there is a multiple inheritance of classes from a common base class, as to whether or not said base class is inherited as a virtual base class, and wherein said normalization means creates said modified program code, when said result is no, such that said base class is inherited as a virtual base class.

54. A processor-readable medium as claimed in claim 37, wherein said collation means checks said result of analysis, when there are multiple base classes in a definition of inheritance, as to whether or not all of said base classes are provided with an access level specifier, and wherein said normalization means creates said modified program code, when said result is no, such that all of said base classes are provided with an access level specifier.

55. A computer-readable storage medium storing a process supporting object oriented programming, said process comprising:

analyzing an object-oriented program code;

collating a result of the analyzing process to a convention information held in a storage unit as to whether or not said analysis result is in conformity with said convention; and outputting a corrected program of said object-oriented program such that said corrected program is in conformity with said convention, when said analysis result is in conflict with said convention.

56. A computer-implemented method of supporting object oriented programming, said method comprising:

analyzing an object-oriented program code;

collating a result of said analyzing process to a convention information held in a storage unit as to whether or not said analysis result is in conformity with said convention; and outputting a corrected program of said object-oriented program such that said corrected program is in conformity with said convention, when said analysis result is in conflict with said convention.

57. A method as claimed in claim 56, wherein said collating process comprises checking said analysis result for existence of a global variable, and wherein said outputting process comprises creating a modified program, when a global variable is detected, such that said modified program does not includes said global variable.

58. A method as claimed in claim 56, wherein said collating process comprises checking said analysis result as to whether or not a creation of an object in said object-oriented program occurs in conformity with said convention, and wherein said outputting process comprises creating said modified program, when said result of said collating process is no, such that said object is created in conformity with said convention.

59. A method as claimed in claim 56, wherein said collating process comprises checking said analysis result as to whether or not a destruction of an object in said object-oriented program occurs in conformity with said convention, and wherein said outputting process comprises creating said modified program, when said result of said collation process is no, such that said object is destroyed in conformity with said convention.

60. A method as claimed in claim 56, wherein said collating process comprises checking said analysis result as to whether or not initialization of an object in said object-oriented program occurs in conformity with said convention by using information on memory management included in said analysis result, and wherein said outputting process comprises creating said modified program, when said result of said collation process is no, such that said object is initialized in conformity with said convention.

61. A method as claimed in claim 56, wherein said collating process comprises checking said analysis result as to whether or not copying of an object in said object-oriented program occurs in conformity with said convention by using information on memory management included in said analysis result, and wherein said outputting process comprises creating said modified program, when said result of said collation step is no, such that said object is copied in conformity with said convention.

62. A method as claimed in claim 56, wherein said collating process comprises checking said analysis result as to whether or not there is a call-by-value parameter for said object, and wherein said outputting process comprises creating said modified program, when said result of said collation process is no, such that there is no call-by-value parameter for said object.

63. A method as claimed in claim 56, wherein said collating process comprises checking said analysis result as to whether or not there is a public data member opened to outside a class, and wherein said outputting process comprises creating said modified program, when said result of said collation process is no, such that said data member is private.

64. A method as claimed in claim 56, wherein collating process comprises checking said analysis result as to whether or not a member function returns a pointer of a data member, and wherein said outputting process comprises creating said modified program, when said result of said collation process is no, such that said member function does not return said pointer of said data member.

65. A method as claimed in claim 56, wherein said collating process comprises checking said analysis result as to whether or not a member function is a simple data access function, and wherein said outputting process comprises creating said modified program, when said result of said collation process is no, such that said member function is not said simple data access function.

66. A method as claimed in claim 56, wherein said collating process comprises checking said analysis result as to whether or not a copy constructor is defined properly when there is a class including a pointer-type data member, and wherein said outputting process comprises creating, upon confirmation of intent of a user of said support system, said modified program, when said result of said collation process is no, such that said copy constructor is defined properly.

67. A method as claimed in claim 56, wherein said collating process comprises checking said analysis result as to whether or not a destructor is defined properly when there is a class including a pointer-type data member, and wherein said outputting process comprises creating, upon confirmation of intent of a user of said support system, said modified program, when said result of said collation process is no, such that said destructor is defined properly.

68. A method as claimed in claim 56, wherein said collating process comprises checking said analysis result as to whether or not an assignment operator is defined properly when there is a class including a pointer-type data member, and wherein said outputting comprises creating, upon confirmation of intent of a user of said support system, said modified program, when said result of said collation process is no, such that said assignment operator is defined properly.

69. A method as claimed in claim 56, wherein said collating process comprises checking said analysis result as to whether or not there is an inheritance about specific accessing, and wherein said outputting process comprises creating said modified program, when said result of said collation process is yes, such that said inheritance is proper.

70. A method as claimed in claim 56, wherein said collating process comprises checking said analysis result as to whether or not there is a redefinition of an inherited non-virtual function, and wherein said outputting process comprises creating said modified program, when said result of said collation process is yes, such that said inherited non-virtual function is not redefined.

71. A method as claimed in claim 56, wherein said collating process comprises checking said analysis result as to whether or not a destruction of object is functioning properly in an inherited class, and wherein said outputting process comprises creating said modified program, when said result of said collation process is no, such that said destruction of object occurs properly.

72. A method as claimed in claim 56, wherein said collating process comprises checking said analysis result, when there is a multiple inheritance of classes from a common base class, as to whether or not said base class is inherited as a virtual base class, and wherein said outputting process comprises creating said modified program, when said result of said collation process is no, such that said base class is inherited as a virtual base class.

73. A method as claimed in claim 56, wherein said collating process comprises checking said analysis result, when there are multiple base classes in a definition of inheritance, as to whether or not all of said base classes are provided with an access level specifier, and wherein said outputting process comprises creating, upon confirmation of intent of a user of said support system, said modified program, when said result of said collation process is no, such that all of said base classes are provided with an access level specifier.

74. A support system of object oriented programming, comprising:
   a syntax analysis unit analyzing object-oriented convention of an object-oriented program; and
   a processing unit collating a result of analysis of the syntax analysis unit to a stored convention information corresponding to the object-oriented program correcting the object-oriented program and outputting a corrected program of the object-oriented program if the analysis result conflicts with the convention such that the corrected program conforms with the convention.

75. A computer specially configured by executing program code stored on a computer-usable media supporting object oriented programming, said program code comprising:
   a computer-readable syntax analysis unit supplied with an object-oriented program code analyzing object-oriented convention of said object-oriented program code;
   a computer-readable collation unit collating a result of analysis of said syntax analysis unit to a convention information, which corresponds to said object-oriented program and held in a storage unit, as to whether said result of analysis is in conformity with said convention; and
   a computer-readable normalization unit correcting said object-oriented program and outputting a corrected program of said object-oriented program such that said corrected program is in conformity with said convention, when said result of analysis is in conflict with said convention.

76. A processor-readable medium storing program code supporting object oriented programming, said program code comprising:

a computer-readable syntax analysis unit supplied with an object-oriented program code analyzing object-oriented convention of said object-oriented program code;

a computer-readable collation means collating a result of analysis of said syntax analysis unit to a convention information, which corresponds to said object-oriented program and held in a storage unit, as to whether said result of analysis is in conformity with said convention; and a computer-readable normalization unit correcting said object-oriented program and outputting a corrected program of said object-oriented program such that said corrected program is in conformity with said convention, when said result of analysis is in conflict with said convention.

77. A method of conforming an object oriented program to a convention corresponding to the program, comprising:

determining by a computer an object oriented convention from the object oriented program;

comparing by the computer the determined object oriented information to the convention; and modifying by the computer the object oriented program based on the comparing to conform to the convention.

* * * * *

UNITED STATES PATENT AND TRADEMARK OFFICE
CERTIFICATE OF CORRECTION

PATENT NO. : 6,237,139 B1  
DATED : May 22, 2001  
INVENTOR(S) : Yuuji Hotta et al.

Page 1 of 2

It is certified that error appears in the above-identified patent and that said Letters Patent is hereby corrected as shown below:

<u>Title page,</u>
OTHER PUBLICATIONS,
Lines 2 and 15, change "orienetd" to -- oriented --;
Line 10, change "objcet" to -- object --;
Line 20, change "direcetd" to -- directed --.

<u>Column 28,</u>
Line 17, after "analyzing" insert -- an object-oriented convention of --;
Line 19, change "of" to -- corresponding to --;
Line 24, after "unit" insert -- correcting said program and --;
Line 33, change "includes" to -- include --.

<u>Column 30,</u>
Line 18, after "analyzing" insert -- object-oriented convention of --;
Line 22, after "information" insert -- , which corresponds to said object-oriented program and --;
Line 25, after "means for" insert -- correcting said object-oriented program and --.

<u>Column 31,</u>
Line 26, delete "25".

<u>Column 32,</u>
Line 18, after "analyzing" insert -- object oriented convention of --;
Line 22, after "information" insert -- , which corresponds to said object oriented program --;
Line 25, after "means for" insert -- correcting said object-oriented program and --.

UNITED STATES PATENT AND TRADEMARK OFFICE
CERTIFICATE OF CORRECTION

PATENT NO.  : 6,237,139 B1
DATED       : May 22, 2001
INVENTOR(S) : Yuuji Hotta et al.

It is certified that error appears in the above-identified patent and that said Letters Patent is hereby corrected as shown below:

Column 34,
Line 24, after "analyzing" insert -- object-oriented convention of --;
Line 26, after "information" insert -- , which corresponds to said object-oriented program and -- and after "unit" insert -- , --;
Line 29, before "outputting" insert -- correcting said object oriented program and --;.
Line 35, after "analyzing" insert -- object-oriented convention of --;
Line 37, after "information" insert -- , which corresponds to said object-oriented program and --;
Line 40, before "outputting" insert -- correcting said object-oriented program and --.

Column 36,
Line 47, after "program" insert -- , --.

Column 37,
Line 6, change "object oriented" to -- object-oriented --.

Signed and Sealed this

Fifth Day of February, 2002

Attest:

Attesting Officer

JAMES E. ROGAN
Director of the United States Patent and Trademark Office